United States Patent
Okahara et al.

(10) Patent No.: US 11,236,824 B2
(45) Date of Patent: Feb. 1, 2022

(54) CONTINUOUSLY VARIABLE TRANSMISSION CONTROL DEVICE AND CONTROL METHOD

(71) Applicant: JATCO Ltd, Fuji (JP)

(72) Inventors: Ken Okahara, Isehara (JP); Atsushi Shimada, Utsunomiya (JP)

(73) Assignee: JATCO LTD, Fuji (JP)

( * ) Notice: Subject to any disclaimer, the term of this patent is extended or adjusted under 35 U.S.C. 154(b) by 0 days.

(21) Appl. No.: 16/980,502

(22) PCT Filed: Feb. 28, 2019

(86) PCT No.: PCT/JP2019/007724
§ 371 (c)(1),
(2) Date: Sep. 14, 2020

(87) PCT Pub. No.: WO2019/176549
PCT Pub. Date: Sep. 19, 2019

(65) Prior Publication Data
US 2021/0025492 A1    Jan. 28, 2021

(30) Foreign Application Priority Data
Mar. 16, 2018   (JP) .............................. JP2018-048964

(51) Int. Cl.
*F16H 61/66* (2006.01)
*F16H 59/04* (2006.01)
(Continued)

(52) U.S. Cl.
CPC ........... *F16H 61/66* (2013.01); *F16H 59/044* (2013.01); *F16H 59/06* (2013.01); *F16H 59/18* (2013.01);
(Continued)

(58) Field of Classification Search
CPC ............. F16H 61/66; F16H 2061/6616; F16H 59/044; F16H 59/06; F16H 59/18; F16H 59/44; F16H 2059/0239; F16H 2059/366
See application file for complete search history.

(56) References Cited

U.S. PATENT DOCUMENTS

| | | | | |
|---|---|---|---|---|
| 6,544,141 B1 * | 4/2003 | Fuchs | ............... | F16H 61/66254 477/44 |
| 10,139,001 B2 * | 11/2018 | Oguri | ................ | F16H 61/66259 |
| 2017/0284537 A1 * | 10/2017 | Kojima | ............... | F16H 61/0204 |

FOREIGN PATENT DOCUMENTS

| | | |
|---|---|---|
| JP | 2008-190633 A | 8/2008 |
| JP | 4461823 B2 | 5/2010 |

OTHER PUBLICATIONS

Machine translation for JP4461823 filed Jun. 17, 2021 (Year: 2021).*

* cited by examiner

*Primary Examiner* — Tisha D Lewis
(74) *Attorney, Agent, or Firm* — Foley & Lardner LLP

(57) ABSTRACT

A continuously variable transmission has a variator (4) structured to be able to continuously vary a transmission ratio and a control unit (100). The control unit (100) continuously varies a transmission ratio of the variator (4) in a continuously variable shift mode. In a manual mode in which a manual mode switch (36c) is ON, the transmission ratio is maintained. When a shift switch (36a, 36b) is operated by a driver during the manual mode, the control unit (100) performs shift of the variator (4) so as to change an input rotation speed of the variator (4) by a predetermined rotation speed ($\Delta N1$) regardless of a vehicle speed.

5 Claims, 5 Drawing Sheets

(51) Int. Cl.
   *F16H 59/06*   (2006.01)
   *F16H 59/18*   (2006.01)
   *F16H 59/44*   (2006.01)
   F16H 59/02    (2006.01)
   F16H 59/36    (2006.01)
(52) U.S. Cl.
   CPC ..... *F16H 59/44* (2013.01); *F16H 2059/0239* (2013.01); *F16H 2059/366* (2013.01); *F16H 2061/6616* (2013.01)

CONTINUOUSLY VARIABLE TRANSMISSION CONTROL DEVICE AND CONTROL METHOD

TECHNICAL FIELD

The present invention relates to a control device and a control method of a continuously variable transmission, which control a transmission ratio according to driver's operation.

BACKGROUND ART

Patent Document 1 discloses a technique relating to a manual mode in which a plurality of fixed transmission ratios can be selected from a continuously variable shift state (or a stepless shift state) by a shift lever operation. In Patent Document 1, an up-shift switch and a down-shift switch (collectively called a shift switch) that become ON when the shift lever is operated to an up-shift side or a down-shift side in the manual mode are provided, and a shift is performed (a transmission ratio is changed) to a predetermined fixed transmission ratio according to an ON signal of the shift switch. Further, when an ON time of the shift switch is longer than a predetermined time, the transmission ratio can be continuously changed according to the ON time.

In the case of the technique of the Patent Document 1, however, since a variation (an amount of change) in an input rotation speed when a transmission ratio at a time of change to the manual mode is changed to the predetermined fixed transmission ratio is different depending on a timing of change to the manual mode, there arises a problem of giving an odd or awkward feeling to the driver.

The present invention was made in view of such a problem. An object of the present invention is therefore to provide a continuously variable transmission that is capable of stabilizing the variation (the amount of change) in the manual mode.

CITATION LIST

Patent Document

Patent Document 1: Japanese Unexamined Patent Application Publication No. 2008-190633

SUMMARY OF THE INVENTION

A control device of a continuously variable transmission according to the present invention comprises: a continuously variable shift mode configured to, according to a travelling state, continuously vary a transmission ratio of a variator that is provided between a driving source and driving wheels and structured to be able to continuously vary a transmission ratio defined by a ratio between an input rotation speed according to a rotation speed of the driving source and an output rotation speed according to a rotation speed of the driving wheels; and a manual mode configured to, according to driver's operation, shift so as to change the input rotation speed by a predetermined rotation speed regardless of a vehicle speed.

Therefore, by changing the input rotation speed by the predetermined rotation speed regardless of the timing of change to the manual mode, as compared with the case where the shift is performed to the predetermined fixed transmission ratio, the variation (the amount of change) in the input rotation speed due to driver's shift operation can be stabilized, thereby preventing the driver from being subject to an odd or awkward feeling.

EMBODIMENTS FOR CARRYING OUT THE INVENTION

Figure 1:
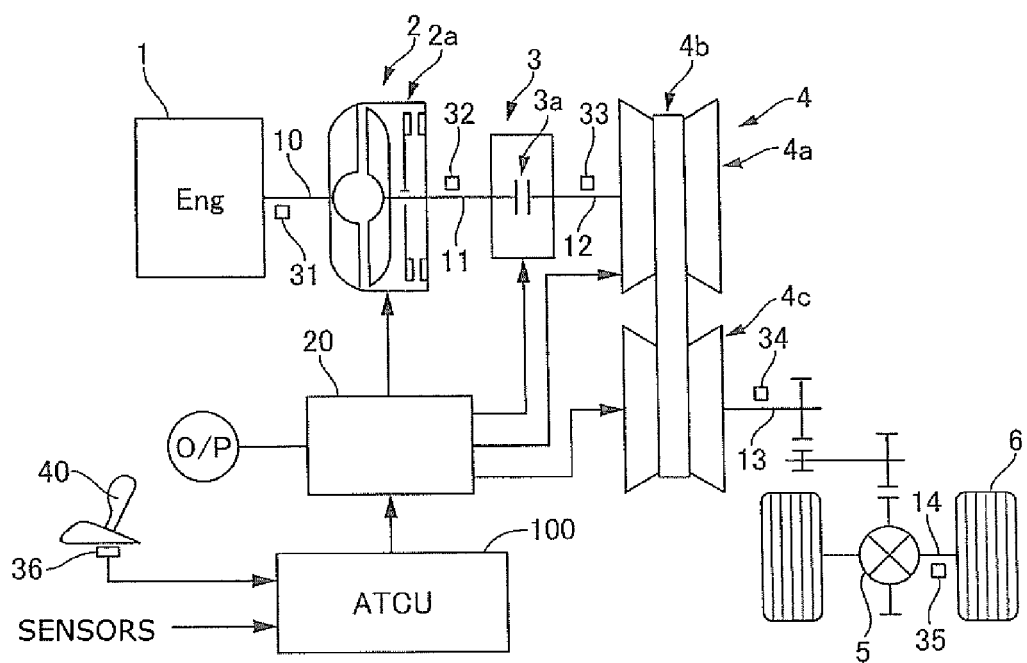
FIG. 1 is a schematic diagram showing a configuration of a continuously variable transmission according to an embodiment of the present invention.

FIG. 1 is a schematic diagram showing a configuration of a continuously variable transmission according to an embodiment of the present invention. The continuously variable transmission changes rotation outputted from an engine 1 and transmits the rotation to driving wheels 6. The continuously variable transmission has a torque convertor 2, a forward-reverse switching mechanism 3, a variator 4 and a differential gear 5. The torque convertor 2 has a lock-up clutch 2*a* that directly connects an engine output shaft 10 connected to the engine 1 and a turbine shaft 11. The forward-reverse switching mechanism 3 has a planetary gear set and two frictional engagement elements (a forward clutch achieving a forward drive state by its engagement and a reverse brake achieving a backward drive state by its engagement) that are hydraulic actuators. Hereinafter, these two frictional engagement elements are collectively called a clutch 3*a*.

An input side of the clutch 3*a* is connected to the turbine shaft 11, and an output side of the clutch 3*a* is connected to an input shaft 12 of the variator 4. The variator 4 has a primary pulley 4*a*, a belt 4*b* and a secondary pulley 4*c*. The secondary pulley 4*c* is connected to an output shaft 13. Between the differential gear 5 and the driving wheels 6, a drive shaft 14 that integrally rotates with the driving wheels 6 is provided.

A control valve 20 has a plurality of control valves that regulate or control each control hydraulic pressure and supply it to the hydraulic actuators with an oil pump OP driven by the engine 1 being a hydraulic pressure source.

The continuously variable transmission has an engine rotation speed sensor 31 that detects a rotation speed (hereinafter, called an engine rotation speed Ne) of the engine output shaft 10, a turbine rotation speed sensor 32 that detects a rotation speed (hereinafter, called a turbine rotation speed Nt) of the turbine shaft 11, a primary rotation speed sensor 33 that detects a rotation speed (hereinafter, called a primary rotation speed Npri) of the input shaft 12 (the primary pulley 4*a*), a secondary rotation speed sensor 34 that detects a rotation speed (hereinafter, called a secondary rotation speed Nsec) of the output shaft 13 (the secondary pulley 4*c*), a wheel speed sensor 35 that detects a rotation speed of the driving wheel 6, an inhibitor switch 36 that detects a range position signal selected by a shift lever 40 operated by a driver and an APO sensor 37 that detects an accelerator pedal opening APO.

A transmission control unit (ATCU) 100 inputs signals of the sensors, performs a hydraulic pressure control according to a travelling state and supplies the hydraulic pressure to the hydraulic actuators. When a vehicle starts, the lock-up clutch 2a is disengaged, and a torque amplification action by the torque convertor 2 is performed. When a vehicle speed VSP is a predetermined speed or greater after the vehicle start, the lock-up clutch 2a is engaged, then fuel efficiency is improved. Further, when the vehicle speed VSP is less than the predetermined speed during deceleration of the vehicle, the lock-up clutch 2a is disengaged, then an engine stall is prevented. Here, during engagement of the lock-up clutch 2a, since the engine rotation speed Ne and the primary rotation speed Npri are the same rotation speed, controlling the primary rotation speed Npri and controlling the engine rotation speed Ne are the same meaning.

Figure 2:
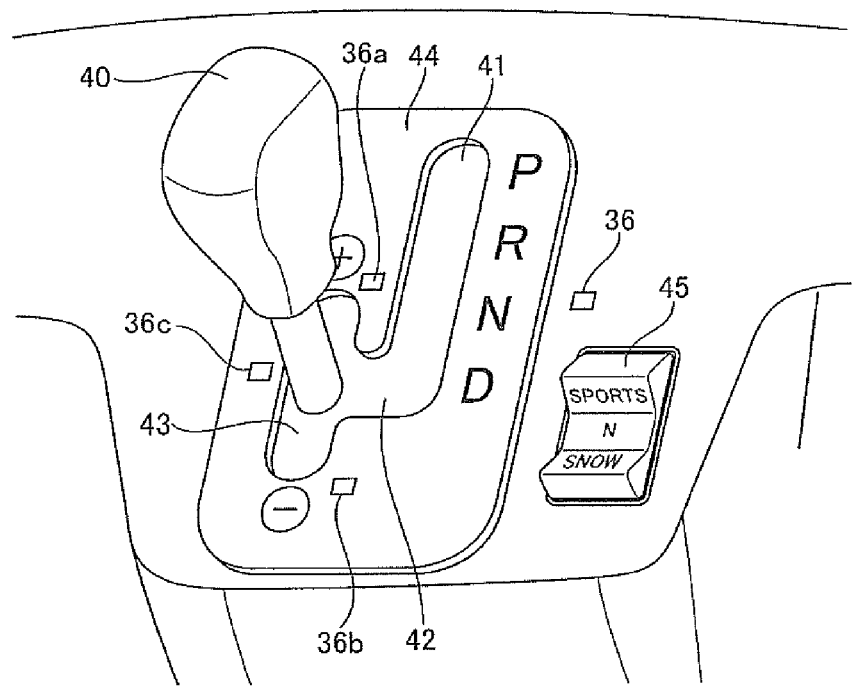
FIG. 2 is a drawing schematically showing a shift lever and its vicinity in a vehicle mounting therein the continuously variable transmission, according to the embodiment.

FIG. 2 is a drawing schematically showing the shift lever and its vicinity in the vehicle mounting therein the continuously variable transmission of the embodiment. The shift lever 40 is provided at a center console in a cabin of the vehicle. A range escutcheon 44 has a main gate 41, a sub gate 43 formed parallel to the main gate 41 and a through gate 42 connecting the both gates 41 and 43. The inhibitor switch 36 detecting the position of the shift lever 40 is provided in the main gate 41. The inhibitor switch 36 has ranges corresponding to range positions of a P-range position, an R-range position, an N-range position and a D-range position. For instance, when the shift lever 40 moves from a range where an N-range position signal is outputted to a range where a D-range position signal is outputted, the inhibitor switch 36 outputs the D-range position signal to the ATCU 100.

A manual mode switch 36c is provided in the sub gate 43. When the shift lever 40 is tilted (or moved) to the sub gate 43 side, the manual mode switch 36c outputs an ON signal. At one end of the sub gate 43, an up-shift switch 36a is provided, and at the other end of the sub gate 43, a down-shift switch 36b is provided. The shift lever 40 is forced at a noncontact neutral position between the up-shift switch 36a and the down-shift switch 36b in the sub gate 43 during no operation.

When the driver intends an up-shift and operates the shift lever 40 to a "+" side in FIG. 2, the up-shift switch 36a outputs an ON signal, whereas when the driver intends a down-shift and operates the shift lever 40 to a "−" side, the down-shift switch 36b outputs an ON signal. It is noted that, in the present embodiment, the shift lever 40 is provided with the up-shift switch 36a and the down-shift switch 36b. However, this configuration is not limited, but the up-shift switch 36a and the down-shift switch 36b could be provided as paddle switches located around a steering wheel.

A mode switch 45 operated by the driver is provided at a position next to the range escutcheon 44. As an example, the mode switch 45 is configured to be able to select three positions of a sports mode, a normal mode and a snow mode, and output a selected mode signal. When the sports mode is selected, the vehicle travels at a high engine rotation speed Ne (at a Low transmission ratio side) as compared with the normal mode, and also a response is increased by increasing a shifting speed of the variator 4. On the other hand, in the snow mode, the vehicle travels at a low engine rotation speed Ne (at a High transmission ratio side) as compared with the normal mode, and also change in acceleration of the vehicle is suppressed and a tire slip (a skid) on a low-μ road is suppressed by decreasing the shifting speed of the variator 4.

Figure 3:
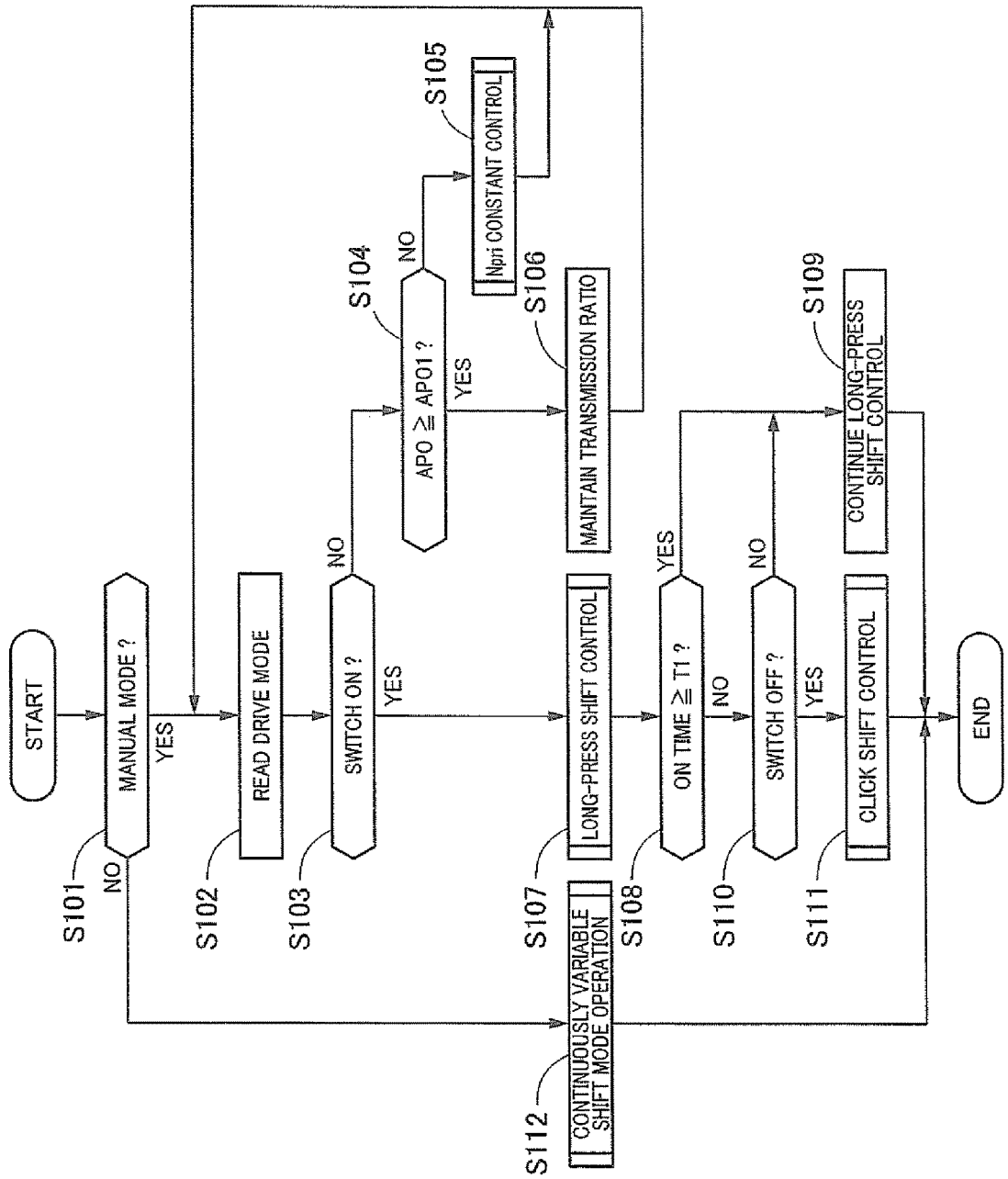
FIG. 3 is a flow chart showing a shift control operation in a manual mode, according to the embodiment.

FIG. 3 is a flow chart showing a shift control operation in the manual mode, according to the embodiment.

At step S101, a judgment is made as to whether or not the manual mode switch 36c is ON. If judged that the manual mode switch 36c is ON, the routine proceeds to step S102. In other cases, a normal continuously variable shift mode operation (or a normal stepless shift mode operation) is performed. The continuously variable shift mode is a mode in which the transmission ratio is continuously varied to a transmission ratio calculated from a predetermined transmission ratio map on the basis of the vehicle speed VSP and the accelerator pedal opening APO.

At step S102, a drive mode selected by the mode switch 45 is read.

At step S103, a judgment is made as to whether or not either the up-shift switch 36a or the down-shift switch 36b (hereinafter, also simply called a shift switch) is ON. If judged that either the up-shift switch 36a or the down-shift switch 36b is ON, the routine proceeds to step S107. In other cases, the routine proceeds to step S104.

At step S104, a judgment is made as to whether or not the accelerator pedal opening APO is equal to or greater than a predetermined opening APO1. If judged that the accelerator pedal opening APO is equal to or greater than the predetermined opening APO1, the routine proceeds to step S106. In other cases, the routine proceeds to step S105. Here, the predetermined opening APO1 is a value that indicates a state in which the driver releases an accelerator pedal. "APO<APO1" means that the driver desires a coast travel state.

At step S105, a primary rotation speed constant control is performed. The primary rotation speed constant control is a control which controls the transmission ratio such that the primary rotation speed Npri is constant in the coast travel state with the lock-up clutch 2a being engaged and which continuously generates an engine brake force occurring by a constant engine rotation speed Ne and decelerates the vehicle. With this control, by only release of the accelerator pedal by the driver, a desired deceleration can be attained, and drivability can be improved.

At step S106, a transmission ratio at a time when the manual mode switch 36c becomes ON is maintained. With this, an unnecessary up-shift and an unnecessary down-shift during selection of the manual mode are not carried out, then the driver is not subject to an odd or awkward feeling.

At step S107, a long-press shift control is performed. The long-press shift control is a control that, when an ON time of the shift switch 36a, 36b is a predetermined time T1 or longer by driver's shift lever operation, judges that this shift lever operation is a long-press operation and changes speed of the variator 4 so as to change the engine rotation speed Ne by a rotation speed according to the ON time. On the other hand, if the ON time of the shift switch 36a, 36b is less than the predetermined time T1, this shift lever operation is judged to be a click operation, and a click shift control is performed (S111). The click shift control is a control that changes the speed of the variator 4 so as to change the engine rotation speed Ne by a predetermined rotation speed ΔN1.

In a case of a related art continuously variable transmission having a conventional manual mode, when the shift switch is operated, the transmission ratio is changed to a predetermined fixed transmission ratio. In other words, the transmission ratio has to be changed to the predetermined fixed transmission ratio, and consequently, a variation (an amount of change) in engine rotation speed Ne is different depending on a timing of change to the manual mode, then there is a risk that the driver will be subject to an odd or awkward feeling. Further, because the transmission ratio is changed to the predetermined transmission ratio, the variation (the amount of change) in engine rotation speed Ne is different depending on the vehicle speed VSP, and there is a risk that the driver will be subject to an odd or awkward feeling. In contrast to this, in the long-press shift control and the click shift control, when the shift switch 36a, 36b is operated, the transmission ratio is controlled such that the engine rotation speed Ne is changed by the predetermined engine rotation speed. Therefore, whatever the vehicle speed is and whenever the change to the manual mode occurs, by stably changing the engine rotation speed Ne, a response according to driver's shifting intention can be obtained.

Here, regarding the driver's shift lever operation in a time period from a moment of press of the shift switch 36a, 36b to a time before the predetermined time T1 elapses, it is not possible to judge whether this shift lever operation is the click operation or the long-press operation. If no control is performed until the predetermined time T1 elapses, when the shift is started after the predetermined time T1 elapses, a response delay occurs, and consequently, the driver is subject to an odd or awkward feeling. Alternatively, if this shift lever operation is immediately judged to be the click operation and the shift is started, there is a risk that the engine rotation speed Ne will be excessively changed as compared with the long-press shift control. Therefore, in the present embodiment, first the long-press shift control is started, then judgment about whether this shift lever operation is the click operation or not is made.

In the long-press shift control, a gradient (or a rate) αNe (see FIG. 5) of change of the engine rotation speed Ne when shifting is set based on the drive mode read at step S102. More specifically, as the transmission ratio is closer to a Low side, the gradient αNe is set to be smaller. With this setting, an occurrence of an excessive engine brake force is suppressed. On the other hand, as the transmission ratio is closer to a High side, the gradient αNe is set to be larger. With this setting, a response upon request of acceleration or deceleration can be increased. As a matter of course, the gradient αNe of change of the engine rotation speed Ne when shifting could be set to the same gradient regardless of the transmission ratio.

Further, for instance, when the drive mode is the sports mode, the gradient αNe is set based on a current transmission ratio and sports mode characteristics. The sports mode characteristics are set so as to have a large gradient αNe as compared with normal mode characteristics. In the sports mode, since the driver desires a quick operation, the engine rotation speed Ne is immediately changed as compared with the normal mode. On the other hand, in the normal mode, by setting the gradient αNe to be small, change of the vehicle speed caused by the change of the engine rotation speed Ne is suppressed. As a matter of course, the gradient αNe of change of the engine rotation speed Ne when shifting could be set to the same gradient regardless of the drive mode.

Figure 4:
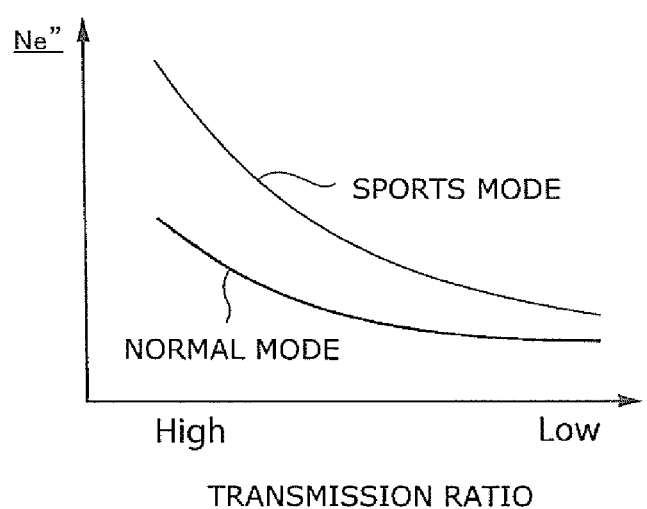
FIG. 4 is a map showing characteristics of gradient that is acceleration of change of an engine rotation speed according to a drive mode, according to the embodiment.

FIG. 4 is a map showing characteristics of Ne" that is acceleration of change of the engine rotation speed Ne according to the drive mode, according to the embodiment. In the long-press shift control, the acceleration Ne" of change of the engine rotation speed Ne when shifting is set based on the drive mode read at step S102. More specifically, as the transmission ratio is closer to the Low side, the change acceleration Ne" is set to be smaller. With this setting, an occurrence of an excessive shock caused by the change of the engine rotation speed Ne is suppressed. On the other hand, as the transmission ratio is closer to the High side, the change acceleration Ne" is set to be larger. With this setting, a response upon request of acceleration or deceleration can be increased.

Further, for instance, when the drive mode is the sports mode, the change acceleration Ne" is set based on a current transmission ratio and sports mode characteristics. The sports mode characteristics are set so as to have a large change acceleration Ne" as compared with normal mode characteristics. In the sports mode, since the driver desires a quick operation, the engine rotation speed Ne is immediately changed as compared with the normal mode. On the other hand, in the normal mode, by setting the change acceleration Ne" to be small, a shock caused by the change of the engine rotation speed Ne is suppressed.

At step S108, a judgment is made as to whether or not the ON time of the shift switch is equal to or longer than the predetermined time T1. If the ON time of the shift switch is shorter than the predetermined time T1, the routine proceeds to step S110. If the ON time of the shift switch is equal to or longer than the predetermined time T1, this is judged to be the long-press operation, and the routine proceeds to step S109.

At step S109, the long-press shift control started at step S107 is maintained.

At step S110, a judgment is made as to whether or not the shift switch is OFF. If the shift switch is OFF, this is judged to be the click operation, and the routine proceeds to step S111. In other cases, the long-press shift control is maintained.

At step S111, the click shift control is performed, then the shift control is carried out such that the engine rotation speed Ne is changed stepwise.

Figure 5:
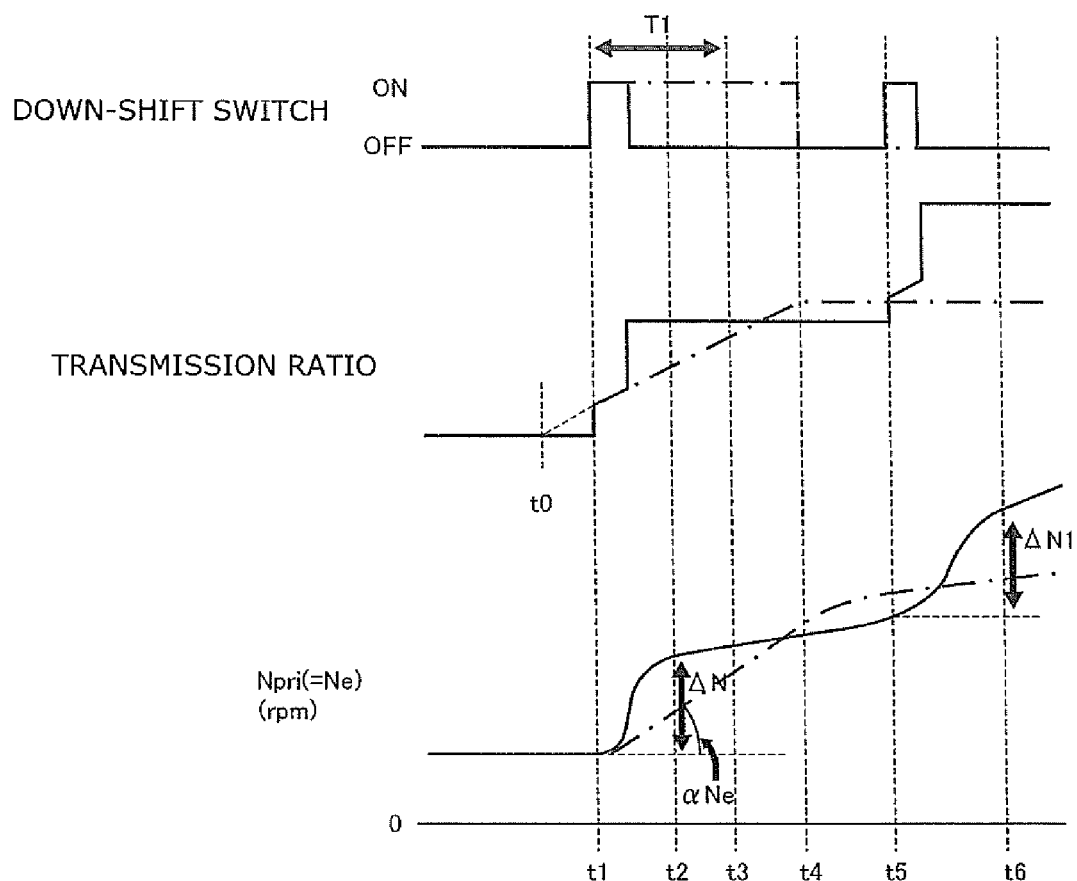
FIG. 5 is time charts showing cases where a long-press shift control is performed and where a click shift control is performed after a down-shift switch is ON, according to the embodiment.

FIG. 5 is time charts showing cases where the long-press shift control is performed and where the click shift control is performed after the down-shift switch 36b is ON, according to the embodiment. In FIG. 5, dashed lines indicate the long-press shift control, and solid lines indicate the click shift control.

When the shift switch becomes ON in the embodiment, the long-press shift control is started regardless of whether the long-press operation or the click operation. At time t0, the driver intends the shift, and at time t1 slightly after time t0, the driver operates the shift lever. Here, when starting the long-press shift control with the shift switch being ON at time t1, the transmission ratio is changed at once to a transmission ratio that is considered to be increased by the change acceleration Ne" and the gradient αNe according to the current transmission ratio and the drive mode of time t0.

Subsequently, when the down-shift switch 36b becomes OFF during change of the transmission ratio at a constant gradient αNe before a lapse of the predetermined time T1 or more, this is judged to be the click operation, and the control is changed to the click shift control. That is, the transmission ratio of the variator 4 is changed stepwise at once such that the primary rotation speed Npri (the engine rotation speed Ne) becomes an engine rotation speed obtained by adding the ΔN1 to the engine rotation speed Ne of a time when the down-shift switch 36b becomes ON.

On the other hand, when an ON time of the down-shift switch 36b continues for the predetermined time T1 or longer, the long-press shift control is maintained. Then, when the down-shift switch 36b becomes OFF at time t4, the long-press shift control is ended, and the engine rotation speed Ne is increased according to a long-press operation time.

Further, as shown by the solid lines, when the down-shift switch 36b becomes ON again at time t5 and the down-shift switch 36b becomes OFF before a lapse of the predetermined time T1 or more, this is judged to be the click operation, and the control is changed to the click shift control, then the transmission ratio of the variator 4 is changed stepwise at once such that the primary rotation speed Npri (the engine rotation speed Ne) becomes an engine rotation speed obtained by adding the ΔN1 to the engine rotation speed Ne of a time when the down-shift switch 36b becomes ON. Here, the shift of time t5 is performed from time t5 to time t6, whereas the above shift of time t1 is performed from time t1 to time t2, and a shift time of the shift of time t5 is relatively longer than a shift time of the shift of time t1, although each shift time is a time for which such shift that the primary rotation speed Npri (the engine rotation speed Ne) becomes the engine rotation speed obtained by adding the same ΔN1 is attained. This is because the transmission ratio at the time t5 is a Low side as compared with the transmission ratio at the time t1, and as shown in FIG. 4, the change acceleration Ne" at the time t5 is set to be smaller than the change acceleration Ne" at the time t1. With this, change in vehicle behavior due to a difference of the transmission ratio can be suppressed.

Here, although FIG. 5 shows an example of the down shift upon request of acceleration, a case where the down shift is requested in order for the driver to control the engine brake force upon request of deceleration is similarly performed. For example, when the driver intends to decrease the engine brake force during execution of the Npri constant control, by operating the up-shift switch, the engine rotation speed Ne is decreased, whereas when the driver intends to increase the engine brake force, by operating the down-shift switch, the engine rotation speed Ne is increased. By operating the shift switches in this manner, the engine brake force can be freely controlled.

As explained above, the present embodiment can obtain the following operations and effects.

(1) An ATCU 100 (a control device of a continuously variable transmission) comprises: a continuously variable shift mode configured to, according to a travelling state, continuously vary a transmission ratio of a variator 4 that is provided between an engine 1 (a driving source) and driving wheels 6 and structured to be able to continuously vary a transmission ratio defined by a ratio between a primary rotation speed Npri (an input rotation speed according to a rotation speed of the driving source) and a secondary rotation speed Nsec (an output rotation speed according to a rotation speed of the driving wheels); and a manual mode configured to, according to driver's operation, shift so as to change the primary rotation speed Npri (same as an engine rotation speed Ne) by a predetermined rotation speed ΔN1 regardless of a vehicle speed.

Therefore, by changing the engine rotation speed Ne by the predetermined rotation speed ΔN1 regardless of the timing of change to the manual mode, as compared with the case where the shift is performed to the predetermined fixed transmission ratio, the variation (the amount of change) in the engine rotation speed Ne due to driver's shift operation can be stabilized, thereby preventing the driver from being subject to an odd or awkward feeling. That is, in the case where the shift is performed to the predetermined fixed transmission ratio, the variation (the amount of change) in the engine rotation speed Ne due to the shift is different depending on a transmission ratio at an occurrence of the driver's shift operation. However, in the embodiment, the variation (the amount of change) in the engine rotation speed Ne due to driver's shift operation can be constant.

(2) The ATCU 100 has a shift switch that is a switch configured to command the variator 4 to perform an up-shift or a down-shift during the manual mode, and when a time of an operation of the shift switch is shorter than a predetermined time T1, the ATCU 100 is configured to judge the shift switch operation to be a click operation and perform the shift of the variator 4 so as to change the engine rotation speed Ne by the predetermined rotation speed ΔN1 according to the click operation.

That is, in the manual mode, the click operation is judged by only the time of the driver's shift switch operation, and the engine rotation speed Ne can be changed stepwise, thereby achieving a driving state according to driver's intention.

(3) The ATCU 100 is configured to, at a start of the operation of the shift switch, perform the shift so as to change the engine rotation speed Ne at a predetermined gradient αNe of change. The ATCU 100 is configured to, while the operation of the shift switch continues, maintain the shift at the predetermined gradient αNe. The ATCU 100 is configured to, when the shift switch operation is ended before a lapse of the predetermined time T1, judge the shift switch operation to be the click operation and change the shift at predetermined gradient αNe to the click operation shift that performs a stepwise change of the engine rotation speed Ne.

That is, regarding the driver's shift lever operation in a time period from a moment of press of the shift switch to a time before the predetermined time T1 elapses, it is not possible to judge whether this shift lever operation is the click operation or the long-press operation. If no control is performed until the predetermined time T1 elapses, when the shift is started after the predetermined time T1 elapses, a response delay occurs, and consequently, the driver is subject to an odd or awkward feeling. Alternatively, if this shift lever operation is immediately judged to be the click operation and the shift is started, there is a risk that the engine rotation speed Ne will be excessively changed as compared with the long-press shift control. Therefore, in the embodiment, first the long-press shift control is started, then judgment about whether this shift lever operation is the click operation or not is made. With this, a driving state according to driver's intention can be achieved while avoiding response delay.

(4) The ATCU 100 is configured to, when performing the shift during the manual mode, change acceleration Ne" of change according to the drive mode.

That is, in the normal mode, by setting the acceleration Ne" of change to be small, an occurrence of an excessive change of the vehicle speed is suppressed. On the other hand, in the sports mode, by setting the acceleration Ne" of change to be large, a response upon request of acceleration can be increased.

(5) The ATCU 100 is configured to, when performing the shift during the manual mode, change acceleration Ne" of change according to the transmission ratio.

That is, as the transmission ratio is closer to the Low side, the acceleration Ne" of change is set to be smaller. With this setting, an occurrence of an excessive shock is suppressed. On the other hand, as the transmission ratio is closer to the High side, the acceleration Ne" of change is set to be larger. With this setting, a response upon request of acceleration or deceleration can be increased.

(6) The ATCU 100 is configured to, when an accelerator pedal opening is less than a predetermined opening APO1, decelerate a vehicle with the input rotation speed being constant.

With this control, by only release of the accelerator pedal by the driver, a desired deceleration can be attained, and drivability can be improved.

Other Embodiments

Although the embodiment for carrying out the present invention has been explained on the basis of the above embodiment, a specified configuration of the present invention is not limited to that in the above embodiment. The configuration includes all design modifications and equivalents belonging to the technical scope of the present invention. The above embodiment shows the engine as a driving source. However, the driving source is not limited to the engine. The present invention can be applied to a hybrid vehicle having the engine and an electric motor and to an electric vehicle having only the electric motor.

The above embodiment shows an example in which the shift switch is operated by the shift lever operation. However, in a case where the paddle shift is used, even if the manual mode switch is not operated, when turning the paddle shift switch ON, the click shift control and the long-press shift control can be performed in the same manner as the present invention regardless of a state of the manual mode switch.

The invention claimed is:

1. A control device of a continuously variable transmission comprising:
   a continuously variable shift mode configured to, according to a travelling state, continuously vary a transmission ratio of a variator that is provided between a driving source and driving wheels and structured to be able to continuously vary a transmission ratio defined by a ratio between an input rotation speed according to a rotation speed of the driving source and an output rotation speed according to a rotation speed of the driving wheels;
   a manual mode configured to, according to driver's operation, shift so as to change the input rotation speed by a predetermined rotation speed regardless of a vehicle speed; and
   a switch configured to command the continuously variable transmission to perform an up-shift or a down-shift during the manual mode,
   wherein when a time of an operation of the switch is shorter than a predetermined time, the control device is configured to judge the switch operation to be a click operation and perform the shift of the variator so as to change the input rotation speed by the predetermined rotation speed according to the click operation.

2. The control device of the continuously variable transmission as claimed in claim 1, wherein:
   the control device is configured to,
      (i) at a start of the operation of the switch, perform the shift of the variator so as to change the input rotation speed at a predetermined rate,
      (ii) while the operation of the switch continues, maintain the shift of the variator at the predetermined rate, and
      (iii) when the operation of the switch is ended before a lapse of the predetermined time, judge the switch operation to be the click operation and change the shift of the variator at the predetermined rate to the shift by the click operation which performs the shift of the variator so as to change the input rotation speed by the predetermined rotation speed from a rotation speed at the start of the switch operation according to the click operation.

3. The control device of the continuously variable transmission as claimed in claim 1, wherein:
   the control device is configured to, when performing the shift during the manual mode, change acceleration of the shift according to the transmission ratio.

4. The control device of the continuously variable transmission as claimed in claim 1, wherein:
   the control device is configured to, when an accelerator pedal opening is less than a predetermined opening, decelerate a vehicle with the input rotation speed being constant.

5. A method of controlling a continuously variable transmission, the continuously variable transmission having a variator that is provided between a driving source and driving wheels and structured to be able to continuously vary a transmission ratio defined by a ratio between an input rotation speed according to a rotation speed of the driving source and an output rotation speed according to a rotation speed of the driving wheels, the method comprising:
   when a continuously variable shift mode is selected by a driver, continuously varying a transmission ratio according to a travelling state; and
   when a manual mode is selected by the driver, maintaining the transmission ratio at a constant transmission ratio, and according to an operation of a shift switch, shifting so as to change the input rotation speed by a predetermined rotation speed regardless of a vehicle speed.

* * * * *